United States Patent [19]

Casler, Jr.

[11] 4,310,850
[45] Jan. 12, 1982

[54] SOLID-STATE VIDEO CAMERA HAVING A VIDEO SIGNAL PROCESSOR

[75] Inventor: Richard J. Casler, Jr., Whitehall, Pa.

[73] Assignee: Bethlehem Steel Corporation, Bethlehem, Pa.

[21] Appl. No.: 170,338

[22] Filed: Jul. 21, 1980

[51] Int. Cl.³ .............................................. H04N 7/18
[52] U.S. Cl. .................................... 358/107; 358/160; 358/166
[58] Field of Search .............. 358/106, 107, 160, 162, 358/166, 167; 364/515

[56] References Cited

U.S. PATENT DOCUMENTS

| | | | |
|---|---|---|---|
| 3,659,950 | 5/1972 | Troll et al. ........................... | 356/199 |
| 3,895,870 | 7/1975 | Cullen et al. ......................... | 356/1 |
| 3,902,811 | 9/1975 | Altman et al. ....................... | 356/398 |
| 3,907,439 | 9/1975 | Zanoni ................................. | 356/160 |
| 4,131,857 | 12/1978 | Clymer ................................ | 328/163 |
| 4,176,376 | 11/1979 | Kamachi .............................. | 358/107 |
| 4,220,972 | 9/1980 | Geokezas ............................. | 358/166 |

OTHER PUBLICATIONS

D. J. Purll, "Survey of Present State of the Art in Applications of Solid-State Image Scanners", *Proceedings of the Society of Photo-Optical Engineers*, vol. 145, pp. 9–17, 3-14-78.

*Primary Examiner*—Howard Britton
*Attorney, Agent, or Firm*—Joseph J. O'Keefe; Michael J. Delaney; George G. Dower

[57] ABSTRACT

The low resolution of state-of-the-art solid-state video cameras with quantized image arrays has limited their usefulness in high-accuracy dimension measurement systems. A video output signal processor with a simple computing element improves the apparent resolution of these cameras by a factor of 10 and more. This is enough to widen the range of measurement applications for these cameras.

11 Claims, 3 Drawing Figures

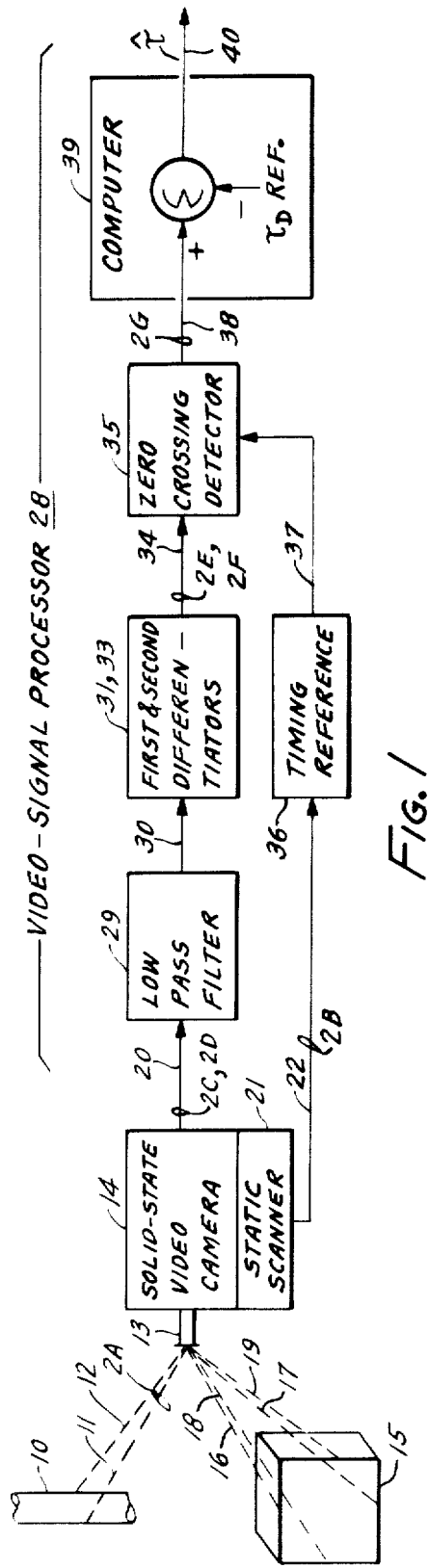
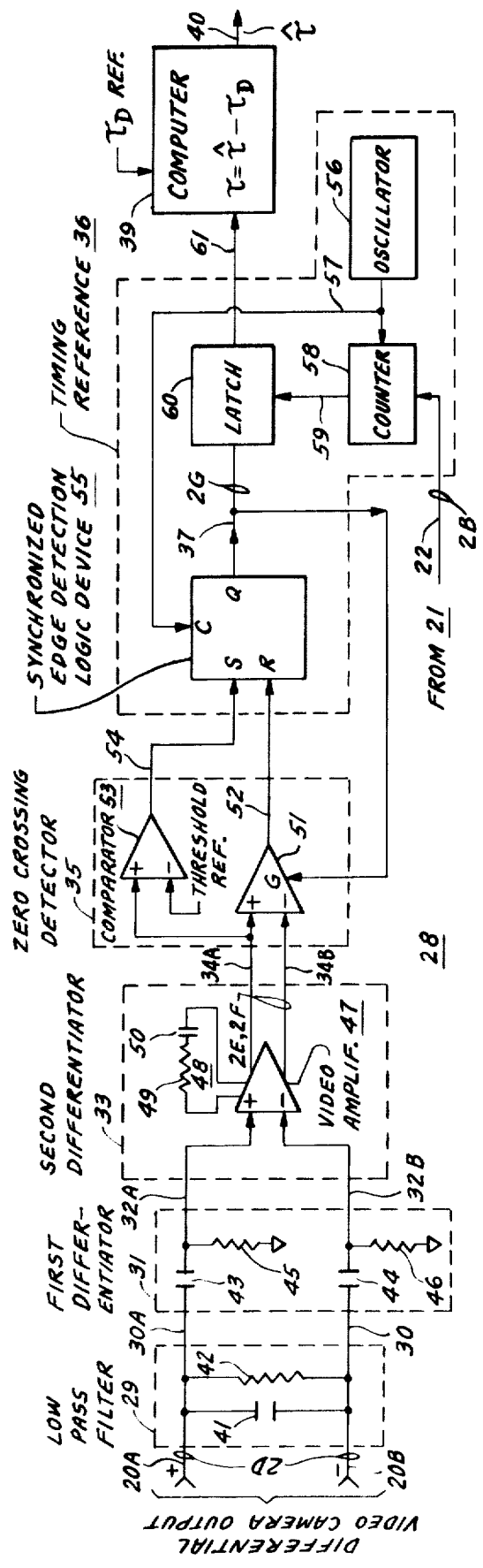

SOLID-STATE VIDEO CAMERA HAVING A VIDEO SIGNAL PROCESSOR

BACKGROUND OF THE INVENTION

1. Field of the Invention

This invention relates broadly to video imaging apparatus. More particularly, this invention relates to video imaging apparatus including an improved low-resolution solid-state video camera having a quantized image array of either linear or area pixels for producing a photogenerated video output signal. Solid-state video cameras referred to herein include charge injection devices (CID), charge coupled devices (CCE) or photodiode (PD) devices.

2. Description of the Prior Art

Commercial solid-state video cameras are both reliable and inexpensive video imaging apparatus but have one drawback. The size of state-of-the-art pixel arrays is limited, thus classifying them as low-resolution type. Because of this limitation, they cannot be used to provide high-resolution information where high-accuracy (0.1% or better) dimensional measurements are required of objects in a wide field of view.

Prior art detection techniques for object outline and edge position, while satisfactory for their intended purpose, have not proved workable in solving the aforesaid problems with low-resolution, noisy, solid-state video camera output signals. In one type of camera, the video output signal is level detected to determine in which photo element represented by a pixel pulse the step of illuminating an object edge occurs. Low-resolution pixel pulses are often indefinative because of their irregular pulse slope and therefore not very susceptible to accurate level detection. In another type of camera, the pixel pulse level representing an object edge may vary from below a minimum to a maximum level, depending upon illumination level of the object, thus detracting from the level detecting technique. Additional prior art differentiating and zero crossing detection techniques, as well as computer statistical analysis techniques, have been tried to precisely detect object outline and edge position but either did not work satisfactorily or was too expensive for on-line applications.

SUMMARY OF THE INVENTION

A main object of this invention is to provide improved, yet inexpensive, video imaging apparatus.

Another object of this invention is to provide lowresolution solid-state video cameras with improved apparent object resolution.

Still another object of this invention is to provide solid-state video cameras with improved performance capabilities.

The foregoing objects may be achieved by providing video imaging apparatus comprising a solid-state video camera having low-resolution quantized image array and a video output signal processor with a simple computing element to enhance object edge resolution more than 10×. The processor includes video signal low pass filters, double-differentiators, a zero crossing detector and a pixel scan timing reference. Pixel scan position of the differentiator zero crossing has been discovered to be related to true edge position output from the video signal processor and a constant known time delay. The simple computing element is provided to combine the true edge position and time delay parameters for use in subsequent object measuring circuits. This arrangement widens the range of measurement applications of commercial solid-state video cameras.

BRIEF DESCRIPTION OF THE DRAWINGS

FIG. 1 is a block diagram of video imaging apparatus employing the present invention.

FIG. 3 is a schematic diagram showing essentially the video signal processor of the present invention.

DESCRIPTION OF A PREFERRED EMBODIMENT

Figure 2:
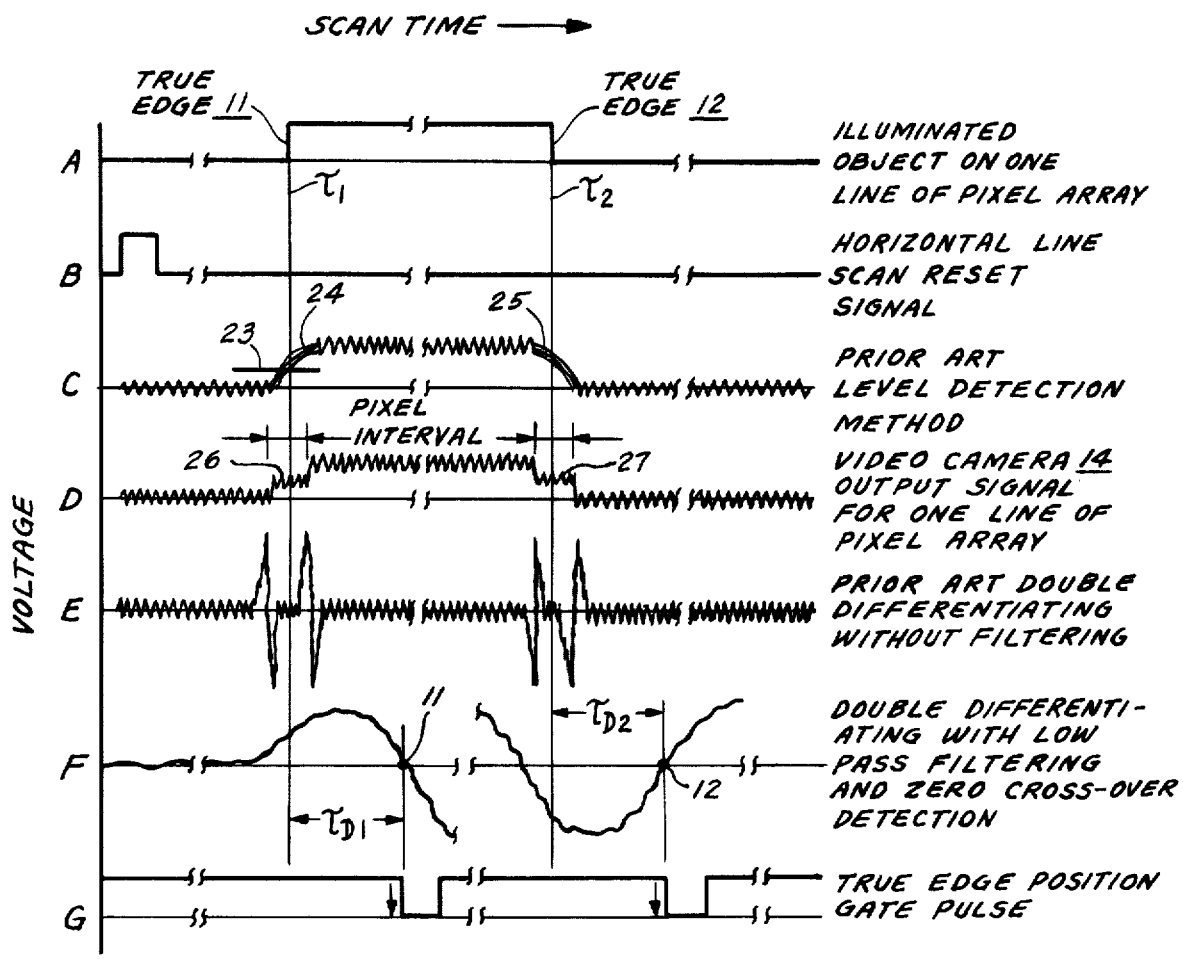
FIGS. 2A-2G are waveforms of video camera and processor signals occurring in the present invention.

Referring to FIGS. 1 and 2, the video imaging apparatus of the present invention is exemplified in the environment of metal product rolling mills where accurate measurements of either stationary or moving hot objects must be made at a disadvantageous location. A simple object to be measured is bar 10 having two true edges 11, 12, between which an accurate linear dimension is to be measured. An illuminated linear image of bar 10 with true edges 11,12 is picked up from some distance by lens 13 and applied to commercial solid-state video camera 14.

It may be desirous to measure a more complex object such as plate 15 having two horizontal true edges 16,17 and two vertical true edges 18,19, between which two accurate orthogonal dimensions are to be measured, or an area between the four edges determined. Alternatively, an object with an irregularly shaped area may be determined, if for example, the shape touches or lies between the four horizontal and vertical true edges 16-19. Regardless, an illuminated orthogonal or area image of the object, such as plate 15, is picked up from some distance by lens 13 and applied to solid state video camera 14 instead of the linear image representing bar 10.

The quantized image array of pixels contained in commercial solid-state video camera 14 may be of the charge injection device (CID) type by General Electric Co., the charge coupled device (CCD) type by either Fairchild Corp. or Hughes Aircraft Corp., or the photodiode (PD) type by Reticon Corp. Each of these quantized image arrays is of the low-resolution type as opposed to a higher resolution capability of a more complex vidicon type of video camera. A linear quantized image array is satisfactory for accurate linear dimensional measurements of bar 10 between edges 11,12. However, an area quantized image array is preferred because of its increased versatility for accurate linear, orthogonal and area dimensional measurements of an object represented by plate 15 between true edges 16,17 and 18,19.

Of those commerically available solid-state video cameras having an area array of quantized pixels, but still a low-resolution type, a CID type by General Electric Co., Series TN2000 or TN2500, is preferred for use as camera 14. Accordingly, a sampled analog video output signal appears on lead 20 having a string of pixel pulses per frame. FIG. 2A shows an ideal video output pulse defining the image received by camera 14 from a simple illuminated object such as bar 10. This object has first and second true edges 11,12 appearing in just one line of a horizontally scanned pixel array. It is simpler to explain the invention by referring hereinafter to bar 10 dimension measurements between true edges 11,12. FIG. 2A defines first true edge 11 occurring in scan time $\tau_1$ and second true edge 12 occurring in scan time $\tau_2$.

Included in solid-state video camera 14 is a solid-state static scanner means 21 having a raster structure when used with an area array in the camera. Static scanner 21 effects horizontal and vertical scanning of camera 14 area array of pixels and causes the string of pixel pulses per frame to be produced in the video output signal on lead 20. A pixel interval has a read time of about 280 nanoseconds. Static scanner 21 is modified so that before the first pixel interval occurs on each horizontal line scan, a horizontal line scan reset pulse as shown in FIG. 2B is output on lead 22. The reset pulse is used in a timing reference described below. Since camera 14 has an area array, static scanner causes the next horizontal line in a vertical row of pixels to be scanned to repeat the same, or another, ideal video output pulse. If camera 14 had only a linear array of pixels, then static scanner 21 would only scan horizontally and cause the same horizontal line of pixel pulses to repeat the same ideal video output pulse.

In a metal rolling mill environment, ideal conditions are never achieved. The video output signal on lead 20 could be superimposed with an intolerable amount of electrical noise as shown in FIGS. 2C, 2D. FIG. 2C illustrates a typical video output signal and the simple prior art level detection method used to determine when the rise time of the leading edge of the video pulse exceeded level 23. Because of prior art signal processing techniques used in solid-state video cameras, there exists a variability of slope and amplitude 24 in the leading edge dimension of the video output pulse with respect to scan time $\tau_1$. The same conditions cause another variability of slope and amplitude 25 in the trailing edge $\tau_2$. These variables prevent precise timing of the occurrence of true edges 11,12 to the degree necessary for high-accuracy dimension measurement systems.

FIG. 2D illustrates the video output signal produced by solid-state video camera 14 on lead 20. A characteristic of the CID pixel array causes a flat amplitude increase and decrease 26,27, respectively, corresponding to the occurrence of object true edges 11,12 at scan times $\tau_1$, $\tau_2$. The actual video signal amplitude at 26,27 is governed by the intensity of illumination of object true edges 11,12. Nevertheless, the flat levels of video output signal at 26,27 enables a far better definition to be made of object true edges 11,12 occurring at scan times $\tau_1$, $\tau_2$ than any of the prior art devices.

Returning to FIG. 1, the video output signal 2D on lead 20 is subjected to special processing techniques in video signal processor 28. Processor 28 uses differential circuits to reject common mode noise in an industrial environment and other circuits to enhance object edge resolution, thereby improving the apparent resolution of solid-state video camera 14, by a factor of 10 and more. The video signal processor 28 comprises low pass filter 29, an output on lead 30 to first and second differentiators 31, 33, an output of FIG. 2F on lead 34 to gated zero crossing detector means 35, a timing reference 36 responsive to the horizontal line scan reset pulse 2B on lead 22 for synchronizing operation of the zero crossing detector 35 so as to output a true edge position gate pulse FIG. 2G on lead 38. A simple computing element 39 with summing junction combines the true edge position gate pulse 2G and a constant known time delay reference $\tau_D$ and outputs a scan position pulse on lead 40.

It has been discovered that camera 14 pixel scan position of the second differentiator 33 zero crossing shown in 2F is related to true edge position gate pulse 2G and a constant known delay according to:

$$\hat{\tau} = \tau + \tau_D + \tau_E \qquad \text{Eq. 1}$$

where:
$\hat{\tau}$ = scan position of the zero crossing,
$\tau$ = true edge position,
$\tau_d$ = the constant known delay, related to the filtering time constant as described below,
$\tau_E$ = error in detection inherent in quantized digital pixel arrays used in solid-state video cameras.

Equation 1 is solved by the simple computing element 39, output of which is scan position $\hat{\tau}$ on lead 40. $\tau_E$ is generally a small quantity and has been neglected in the solution provided by computer 39. Equation 1 is useful with both linear and area arrays usable in solid-state video camera 14.

Turning now to FIGS. 2 and 3, a description of video signal processor 28 for enhancing object edge resolution by a factor of 10 and more follows. It is assumed that a differential type video camera output signal with noise 2D is fed over leads 20A, 20B to the input of low pass filter 29. Device 29 has capacitor 41 and resistor 42 for first low pass filtering of the video output signal. The filtered differential video output signal is fed over leads 30A,30B to first differential differentiator 31 where capacitors 43,44 and resistors 45,46 perform both first differential differentiation and second low pass filtering functions.

First differential differentiator 31 output is fed over leads 32A, 32B to the input of second differential differentiator 33. Here differential video amplifier 47 amplifies the first differential differentiated signal and, by means of circuit 48 consisting of resistor 49 and capacitor 50, performs gain control, second differential differentiating and third low pass filtering functions. Without filtering, as occurs in prior art double differentiating, a video output signal with both mill and differentiating noise as shown in FIG. 2E would be present on output leads 34A, 34B. Instead, by using low pass filtering a smooth differential, double differentiated video output signal as shown in FIG. 2F is actually present on output leads 34A, 34B.

One of the features of the present invention is that the combined time delay constant of combined low pass filtering means comprising devices 29, 31, 33 is equal to $\tau_D$ referred to in Equation 1 above. Further, that $\tau_D$ is approximately equal to at least one pixel interval, providing object width between true edges 11,12 is at least two time constants. In actual practice, a time delay constant $\tau_D$ found useful is approximately equal to three pixel intervals.

Another feature of the present invention is that the zero crossover of the smoothly filtered, double differentiated video output signal 2F on leads 34A, 34B, occur at the end of the time delay constant $\tau_D$. This is clearly shown in FIG. 2F where a negative-going zero crossing occurs at $\tau_{D1}$ after a pixel is imaged by an object first true edge 11, and a positive-zero crossing occurs at $\tau_{D2}$ after another pixel is imaged by an object second true edge 12. Thus, the low pass filtering and double differentiating with zero crossover detection contribute materially in the enhancement of object edge resolution.

Prior art techniques used for double differentiating the outputs of other types of imaging devices with continuous response characteristics, such as vidicon tubes and image dissector tubes, has its results shown in FIG. 2E. This prior art technique is not acceptable for enhancing edge resolution of quantized image arrays for three reasons. First, the prior art does not teach filtering of a sampled, double differentiated video signal from a pixel array as means of improving edge measurement resolution. Particularly, it does not specify the relationship between the known, constant time delay $\tau_D$ and pixel interval to enhance edge resolution. Second, the prior art lacks a relationship between a zero crossover of the filtered, double differentiated video output signal with respect to the known constant time delay $\tau_D$. Third, the prior art does not disclose synchronizing zero crossover detection of the filtered, double differentiated video output signal 2F with horizontal scan position as is described below.

The filtered, differential, double differentiated video output signal 2F on leads 34A, 34B is fed to gated zero crossing detector means 35 and input to gated differential zero crossing detector 51. A positive-going zero cross pulse is output on lead 52 whenever the filtered double differentiated video output signal crosses zero. Device 35 also includes comparator 53 having one input connected to the positive side of the filtered, differential, double differentiated video output signal on lead 34A and another input to a threshold reference. Comparator 53 outputs on lead 54 an edge trigger pulse whenever the filtered, double differentiated video output signal representing object true edge 11 or 12 exceeds a positive threshold level.

In FIG. 3, the timing reference 36 has been modified for digital operation. For this reason it is provided with synchronized edge detection logic device 55 and 36 MHz. oscillator 56 which outputs a clock pulse on lead 57. Logic device 55 receives the zero cross pulse and the edge trigger pulse at reset (R) and set (S) inputs, respectively, and also receives a clock pulse at clock (C) input to synchronize operations. The zero cross pulse and the edge trigger pulse are combined in logic device 55 to produce a true edge position gate pulse at output (Q) and on lead 37 as shown in FIG. 2G. A negative-going trailing edge of true edge position gate pulse, which defines $\tau$ in Equation 1, is fed back to the gate (G) input of gated zero crossing detector 51 for controlling gate operation thereof.

The clock pulse on lead 57 is also input to counter 58 which is reset in synchronism with the horizontal line scan rest pulse 2B fed over lead 22 from static scanner 21 to the counter reset input. A digital ouput from counter 58 is fed over lead 59 to a data input on digital latch 60. The true edge position gate pulse 2G on lead 37 is also fed forward to a control input on digital latch 60, thereby controlling true edge position $\tau$ digital data output on lead 61 to a digital version of computer 39. In the illustration of bar 10 as an object with two true edges 11,12, between which highly accurate measurements are to be made, then digital latch 60 will output two digital data points representing true edge positions 11,12, occurring precisely at $\tau_{D1}$ and $\tau_{D2}$. Computer 39 will then solve Equation 1 and output two digital edge data points referenced to $\hat{\tau}$, the scan position of the zero crossing of the double differentiated video output signal.

With the features provided by the video output signal processor of this invention, it is possible to enhance object edge resolution of quantized image arrays by a factor of 10 and more, thus widening the range of measurement applications of commercial solid-state video cameras.

I claim:

1. In video imaging apparatus including a solid-state video camera having a quantized imaging array of pixels which outputs a video signal with a string of pixel-pulses per frame and noise, said apparatus including static scanner means for the video camera which outputs a horizontal line scan reset signal, a video signal processor synchronized with said reset signal for enhancing object edge resolution, comprising:
   (a) a low pass filter for filtering the video output signal;
   (b) first and second differentiators responsive to the low pass filter output, at least one of the differentiators including another low pass filter;
   (c) the combined time delay constant of said low pass filter means being approximately equal to at least one pixel interval, providing the object width is equal to at least two time constants;
   (d) gated zero crossing detector means for detecting a zero crossing of the second differentiator output signal and outputting a variable gate pulse which precisely defines object true edge position relative said time constant; and
   (e) timing reference means synchronized with the horizontal line scan reset signal and operative on the gated zero crossing detector means for controlling the occurrence of the variable gate pulse defining object true edge position.

2. The apparatus of claim 1 wherein one of the differentiators includes a differential amplifier having a differentiating circuit with low pass filtering properties.

3. The apparatus of claim 1 wherein the gated zero crossing detector means includes a gated zero crossing detector for outputting the variable gate pulse and a comparator for producing an edge trigger pulse when the second differentiator output exceeds a threshold reference.

4. The apparatus of claim 3 wherein the timing reference means includes logic means having a logic device with inputs connected to the outputs of the gated zero crossing detector and comparator for synchronizing the variable gate pulse output with the edge trigger pulse.

5. The apparatus of claim 4 wherein the logic means further includes an oscillator for supplying clock pulses to said logic device and a counter, said counter being reset by the horizontal reset pulse and producing a digital output to a latch connected to the output of the logic device, said latch outputing a digital representation of the object true edge position.

6. The apparatus of claim 1 further including computer means responsive to the gate pulse output from the video signal processor and a constant known time delay for determining horizontal scan edge position of said object.

7. Video imaging apparatus comprising:
   (a) a solid-state video camera having a quantized imaging array of pixels which outputs a video signal with a string of pixel-pulses per frame and noise;
   (b) static scanner means for the video camera which outputs a horizontal line scan reset signal; and
   (c) a video signal processor synchronized with said reset signal for enhancing object edge resolution, comprising:
      1. a low pass filter for filtering the video output signal;

2. first and second differentiators responsive to the low pass filter output, at least one of the differentiators including another low pass filter;
3. the combined time delay constant of said low pass filter means being approximately equal to at least one pixel interval, providing the object width is equal to at least two time constants;
4. gated zero crossing detector means for detecting a zero crossing of the second differentiator output signal and outputting a variable gate pulse which precisely defines object true edge position relative said time constant; and
5. timing reference means synchronized with the horizontal line scan reset signal and operative on the gated zero crossing detector means for controlling the occurrence of the variable gate pulse defining object true edge position.

8. The apparatus of claim 7 wherein the solid-state video camera has a low-resolution type of quantized image array.

9. The apparatus of claim 7 wherein the solid-state video camera has a linear quantized image array for producing the video output signal having the string of pixel pulses per frame.

10. The apparatus of claim 7 wherein the solid-state video camera has an area quantized image array for producing a video output signal having sequential strings of pixel pulses per frame, and the static scanner means has both horizontal and vertical scanning outputs for sequentially scanning the strings of pixels in said video camera.

11. The apparatus of claim 7 further including computer means responsive to the gate pulse output from the video signal processor and a constant known time delay for determining horizontal scan edge position of said object.

* * * * *